(12) United States Patent
Sato et al.

(10) Patent No.: US 11,602,414 B2
(45) Date of Patent: Mar. 14, 2023

(54) ALIGNER MATERIAL, CLEANLINESS, AND QUALITY DETECTION VIA ALIGNER CASE

(71) Applicant: ALIGN TECHNOLOGY, INC., San Jose, CA (US)

(72) Inventors: Jun Sato, San Jose, CA (US); Bruce Cam, San Jose, CA (US); Yaser Shanjani, Milpitas, CA (US)

(73) Assignee: ALIGN TECHNOLOGY, INC., San Jose, CA (US)

( * ) Notice: Subject to any disclaimer, the term of this patent is extended or adjusted under 35 U.S.C. 154(b) by 43 days.

(21) Appl. No.: 16/899,281

(22) Filed: Jun. 11, 2020

(65) Prior Publication Data

US 2020/0390523 A1 Dec. 17, 2020

Related U.S. Application Data

(60) Provisional application No. 62/859,893, filed on Jun. 11, 2019.

(51) Int. Cl.
*A61C 7/08* (2006.01)
*A61C 7/00* (2006.01)
*A61C 19/02* (2006.01)

(52) U.S. Cl.
CPC ............... *A61C 7/08* (2013.01); *A61C 7/002* (2013.01); *A61C 19/02* (2013.01); *A61C 2204/005* (2013.01); *G06F 2203/04105* (2013.01)

(58) Field of Classification Search
None
See application file for complete search history.

(56) References Cited

U.S. PATENT DOCUMENTS

| | | | |
|---|---|---|---|
| 5,820,368 A | 10/1998 | Wolk | |
| 6,183,248 B1 | 2/2001 | Chishti et al. | |
| 6,309,215 B1 | 10/2001 | Phan et al. | |
| 6,386,864 B1 | 5/2002 | Kuo | |
| 6,454,565 B2 | 9/2002 | Phan et al. | |
| 6,471,511 B1 | 10/2002 | Chishti et al. | |
| 6,524,101 B1 | 2/2003 | Phan et al. | |
| 6,572,372 B1 | 6/2003 | Phan et al. | |
| 6,607,382 B1 | 8/2003 | Kuo et al. | |
| 6,705,863 B2 | 3/2004 | Phan et al. | |
| 6,783,604 B2 | 8/2004 | Tricca | |
| 6,790,035 B2 | 9/2004 | Tricca et al. | |
| 6,814,574 B2 | 11/2004 | Abolfathi et al. | |
| 6,830,450 B2 | 12/2004 | Knopp et al. | |
| 6,947,038 B1 | 9/2005 | Anh et al. | |
| 7,074,039 B2 | 7/2006 | Kopelman et al. | |
| 7,104,792 B2 | 9/2006 | Taub et al. | |
| 7,121,825 B2 | 10/2006 | Chishti et al. | |

(Continued)

*Primary Examiner* — Xuyang Xia
(74) *Attorney, Agent, or Firm* — FisherBroyles, LLP

(57) ABSTRACT

Embedded sensors and onboard or off-board processing in an aligner case can detect aligner material and/or quality. Material detection can be used for counterfeit detection, or to trigger material specific events. Quality detection can include detection of common aligner failures or defects. A case for a dental appliance may include a tray for supporting the dental appliance, a cover coupled to the tray, and at least one sensor to detect a deformation of the dental appliance. A case for a dental appliance may include a tray for housing the dental appliance, a cover coupled to the tray, and at least one sensor configured to detect a change in material of the dental appliance.

27 Claims, 10 Drawing Sheets

(56) References Cited

U.S. PATENT DOCUMENTS

| | | |
|---|---|---|
| 7,160,107 B2 | 1/2007 | Kopelman et al. |
| 7,192,273 B2 | 3/2007 | McSurdy, Jr. |
| 7,347,688 B2 | 3/2008 | Kopelman et al. |
| 7,354,270 B2 | 4/2008 | Abolfathi et al. |
| 7,448,514 B2 | 11/2008 | Wen |
| 7,481,121 B1 | 1/2009 | Cao |
| 7,543,511 B2 | 6/2009 | Kimura et al. |
| 7,553,157 B2 | 6/2009 | Abolfathi et al. |
| 7,600,999 B2 | 10/2009 | Knopp |
| 7,658,610 B2 | 2/2010 | Knopp |
| 7,766,658 B2 | 8/2010 | Tricca et al. |
| 7,771,195 B2 | 8/2010 | Knopp et al. |
| 7,854,609 B2 | 12/2010 | Chen et al. |
| 7,871,269 B2 | 1/2011 | Wu et al. |
| 7,878,801 B2 | 2/2011 | Abolfathi et al. |
| 7,878,805 B2 | 2/2011 | Moss et al. |
| 7,883,334 B2 | 2/2011 | Li et al. |
| 7,914,283 B2 | 3/2011 | Kuo |
| 7,947,508 B2 | 5/2011 | Tricca et al. |
| 8,152,518 B2 | 4/2012 | Kuo |
| 8,172,569 B2 | 5/2012 | Matty et al. |
| 8,235,715 B2 | 8/2012 | Kuo |
| 8,292,617 B2 | 10/2012 | Brandt et al. |
| 8,337,199 B2 | 12/2012 | Wen |
| 8,401,686 B2 | 3/2013 | Moss et al. |
| 8,517,726 B2 | 8/2013 | Kakavand et al. |
| 8,562,337 B2 | 10/2013 | Kuo et al. |
| 8,641,414 B2 | 2/2014 | Borovinskih et al. |
| 8,684,729 B2 | 4/2014 | Wen |
| 8,708,697 B2 | 4/2014 | Li et al. |
| 8,758,009 B2 | 6/2014 | Chen et al. |
| 8,771,149 B2 | 7/2014 | Rahman et al. |
| 8,899,976 B2 | 12/2014 | Chen et al. |
| 8,899,977 B2 | 12/2014 | Cao et al. |
| 8,936,463 B2 | 1/2015 | Mason et al. |
| 8,936,464 B2 | 1/2015 | Kopelman |
| 9,022,781 B2 | 5/2015 | Kuo et al. |
| 9,119,691 B2 | 9/2015 | Namiranian et al. |
| 9,161,823 B2 | 10/2015 | Morton et al. |
| 9,241,774 B2 | 1/2016 | Li et al. |
| 9,326,831 B2 | 5/2016 | Cheang |
| 9,433,476 B2 | 9/2016 | Khardekar et al. |
| 9,610,141 B2 | 4/2017 | Kopelman et al. |
| 9,655,691 B2 | 5/2017 | Li et al. |
| 9,675,427 B2 | 6/2017 | Kopelman |
| 9,700,385 B2 | 7/2017 | Webber |
| 9,744,001 B2 | 8/2017 | Choi et al. |
| 9,844,424 B2 | 12/2017 | Wu et al. |
| 10,045,835 B2 | 8/2018 | Boronkay et al. |
| 10,111,730 B2 | 10/2018 | Webber et al. |
| 10,150,244 B2 | 12/2018 | Sato et al. |
| 10,201,409 B2 | 2/2019 | Mason et al. |
| 10,213,277 B2 | 2/2019 | Webber et al. |
| 10,299,894 B2 | 5/2019 | Tanugula et al. |
| 10,363,116 B2 | 7/2019 | Boronkay |
| 10,383,705 B2 | 8/2019 | Shanjani et al. |
| D865,180 S | 10/2019 | Bauer et al. |
| 10,449,016 B2 | 10/2019 | Kimura et al. |
| 10,463,452 B2 | 11/2019 | Matov et al. |
| 10,470,847 B2 | 11/2019 | Shanjani et al. |
| 10,492,888 B2 | 12/2019 | Chen et al. |
| 10,517,701 B2 | 12/2019 | Boronkay |
| 10,537,406 B2 | 1/2020 | Wu et al. |
| 10,537,463 B2 | 1/2020 | Kopelman |
| 10,548,700 B2 | 2/2020 | Fernie |
| 10,555,792 B2 | 2/2020 | Kopelman et al. |
| 10,588,776 B2 | 3/2020 | Cam et al. |
| 10,613,515 B2 | 4/2020 | Cramer et al. |
| 10,639,134 B2 | 5/2020 | Shanjani et al. |
| 10,743,964 B2 | 8/2020 | Wu et al. |
| 10,758,323 B2 | 9/2020 | Kopelman |
| 10,781,274 B2 | 9/2020 | Liska et al. |
| 10,813,720 B2 | 10/2020 | Grove et al. |
| 10,874,483 B2 | 12/2020 | Boronkay |
| 10,881,487 B2 | 1/2021 | Cam et al. |
| 10,912,629 B2 | 2/2021 | Tanugula et al. |
| 10,959,810 B2 | 3/2021 | Li et al. |
| 10,993,783 B2 | 5/2021 | Wu et al. |
| 11,026,768 B2 | 6/2021 | Moss et al. |
| 11,026,831 B2 | 6/2021 | Kuo |
| 11,045,282 B2 | 6/2021 | Kopelman et al. |
| 11,045,283 B2 | 6/2021 | Riley et al. |
| 11,103,330 B2 | 8/2021 | Webber et al. |
| 11,123,156 B2 | 9/2021 | Cam et al. |
| 2002/0192617 A1 | 12/2002 | Phan et al. |
| 2004/0166462 A1 | 8/2004 | Phan et al. |
| 2004/0166463 A1 | 8/2004 | Wen et al. |
| 2005/0014105 A1 | 1/2005 | Abolfathi et al. |
| 2005/0186524 A1 | 8/2005 | Abolfathi et al. |
| 2005/0244768 A1 | 11/2005 | Taub et al. |
| 2006/0019218 A1 | 1/2006 | Kuo |
| 2006/0078841 A1 | 4/2006 | Desimone et al. |
| 2006/0115782 A1 | 6/2006 | Li et al. |
| 2006/0115785 A1 | 6/2006 | Li et al. |
| 2006/0199142 A1 | 9/2006 | Liu et al. |
| 2006/0234179 A1 | 10/2006 | Wen et al. |
| 2008/0118882 A1 | 5/2008 | Su |
| 2008/0160473 A1 | 7/2008 | Li et al. |
| 2008/0286716 A1 | 11/2008 | Sherwood |
| 2008/0286717 A1 | 11/2008 | Sherwood |
| 2009/0221931 A1* | 9/2009 | Crohn .................. A61C 19/041 600/547 |
| 2009/0280450 A1 | 11/2009 | Kuo |
| 2010/0055635 A1 | 3/2010 | Kakavand |
| 2010/0129763 A1 | 5/2010 | Kuo |
| 2011/0269092 A1 | 11/2011 | Kuo et al. |
| 2013/0209964 A1* | 8/2013 | Nemeh ................ A61C 17/005 264/16 |
| 2014/0067334 A1 | 3/2014 | Kuo |
| 2015/0265376 A1 | 9/2015 | Kopelman |
| 2015/0366637 A1 | 12/2015 | Kopelman et al. |
| 2015/0366638 A1 | 12/2015 | Kopelman et al. |
| 2016/0100924 A1* | 4/2016 | Wilson .................. A45D 44/20 206/63.5 |
| 2016/0193014 A1 | 7/2016 | Morton et al. |
| 2016/0242870 A1 | 8/2016 | Matov et al. |
| 2016/0242871 A1 | 8/2016 | Morton et al. |
| 2017/0007359 A1 | 1/2017 | Kopelman et al. |
| 2017/0007360 A1 | 1/2017 | Kopelman et al. |
| 2017/0007361 A1 | 1/2017 | Boronkay et al. |
| 2017/0007366 A1 | 1/2017 | Kopelman et al. |
| 2017/0007386 A1 | 1/2017 | Mason et al. |
| 2017/0135792 A1 | 5/2017 | Webber |
| 2017/0135793 A1 | 5/2017 | Webber et al. |
| 2017/0165032 A1 | 6/2017 | Webber et al. |
| 2018/0014747 A1* | 1/2018 | Akselrod ............. A61B 5/0531 |
| 2018/0153648 A1 | 6/2018 | Shanjani et al. |
| 2018/0168776 A1 | 6/2018 | Webber |
| 2018/0360567 A1 | 12/2018 | Xue et al. |
| 2018/0368944 A1 | 12/2018 | Sato et al. |
| 2019/0000592 A1 | 1/2019 | Cam et al. |
| 2019/0000593 A1 | 1/2019 | Cam et al. |
| 2019/0021817 A1 | 1/2019 | Sato et al. |
| 2019/0029775 A1 | 1/2019 | Morton et al. |
| 2019/0046297 A1 | 2/2019 | Kopelman et al. |
| 2019/0099129 A1 | 4/2019 | Kopelman et al. |
| 2019/0102880 A1* | 4/2019 | Parpara .................. G06T 7/001 |
| 2019/0110746 A1* | 4/2019 | Dau ........................ A61B 5/682 |
| 2019/0125494 A1 | 5/2019 | Li et al. |
| 2019/0125497 A1 | 5/2019 | Derakhshan et al. |
| 2019/0152152 A1 | 5/2019 | O'Leary et al. |
| 2019/0175304 A1 | 6/2019 | Morton et al. |
| 2019/0231477 A1 | 8/2019 | Shanjani et al. |
| 2019/0262101 A1 | 8/2019 | Shanjani et al. |
| 2019/0298494 A1 | 10/2019 | Webber et al. |
| 2019/0314119 A1 | 10/2019 | Kopelman et al. |
| 2019/0338067 A1 | 11/2019 | Liska et al. |
| 2019/0343606 A1 | 11/2019 | Wu et al. |
| 2020/0000553 A1 | 1/2020 | Makarenkova et al. |
| 2020/0086553 A1 | 3/2020 | Mojdeh et al. |
| 2020/0100864 A1 | 4/2020 | Wang et al. |
| 2020/0100865 A1 | 4/2020 | Wang et al. |
| 2020/0100866 A1 | 4/2020 | Medvinskaya et al. |
| 2020/0100871 A1 | 4/2020 | Wang et al. |

(56) References Cited

U.S. PATENT DOCUMENTS

| | | |
|---|---|---|
| 2020/0155276 A1 | 5/2020 | Cam et al. |
| 2020/0188062 A1 | 6/2020 | Kopelman et al. |
| 2020/0214598 A1 | 7/2020 | Li et al. |
| 2020/0214801 A1 | 7/2020 | Wang et al. |
| 2021/0078357 A1 | 3/2021 | Venkatasanthanam |
| 2021/0147672 A1 | 5/2021 | Cole et al. |

* cited by examiner

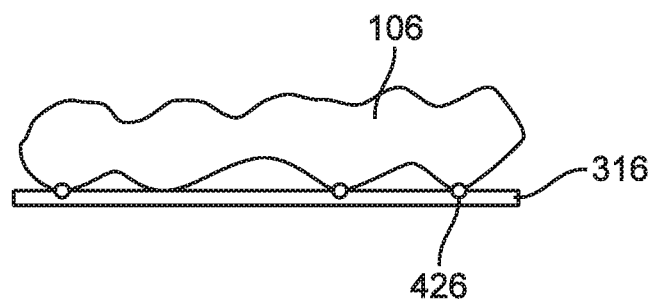
FIG. 4A
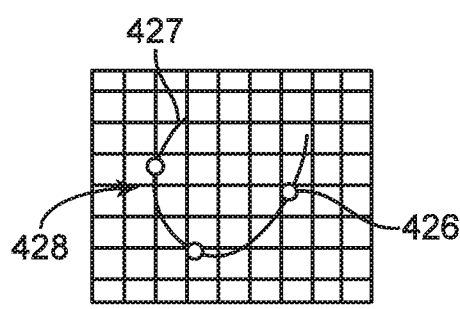
FIG. 4B
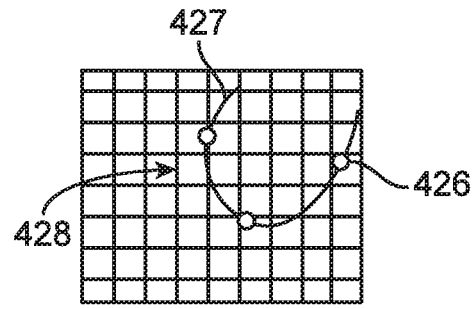
FIG. 4C
Contact signature
$$\left\{ \vec{p}^{1/2}, \vec{p}^{2/3}, \vec{p}^{3/4}, \ldots \vec{p}^{n/n} \right\}$$
FIG. 4D

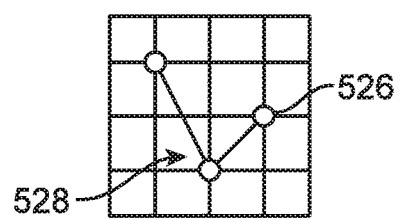 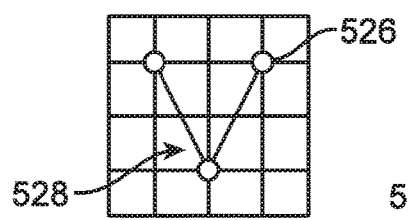 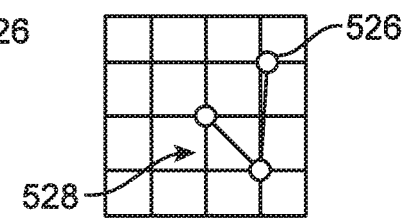
FIG. 5A  FIG. 5B  FIG. 5C
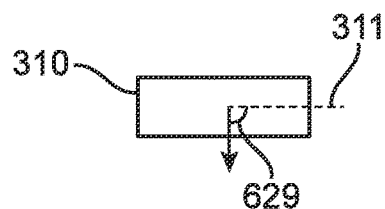 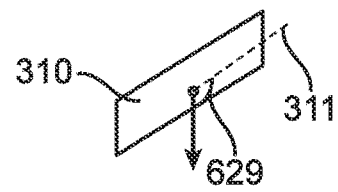
FIG. 6A  FIG. 6B

ALIGNER MATERIAL, CLEANLINESS, AND QUALITY DETECTION VIA ALIGNER CASE

REFERENCE TO EARLIER FILED APPLICATION

This application claims the benefit under 35 U.S.C. § 119(e) of U.S. Provisional Patent Application No. 62/859,893, filed Jun. 11, 2019, and titled "ALIGNER MATERIAL AND QUALITY DETECTION VIA ALIGNER CASE," which is incorporated, in its entirety, by this reference.

BACKGROUND

Some patients have teeth with malocclusions or less than ideal aesthetics, and it can be beneficial to move a patient's teeth toward a desired arrangement in order to correct malocclusions and/or improve aesthetics. To achieve these objectives, orthodontic and dental appliances such as braces, shell aligners, and the like can be applied to the patient's teeth. An appliance can be configured to exert force on one or more teeth in order to effect desired teeth movements according to stages of a treatment plan. In some instances, a treatment plan with different stages of treatment may be generated by a treatment professional (local, remote, etc.) and/or automated system. The treatment plan may prescribe appliance(s) for each stage of the treatment to the patient. The patient can be asked to wear an appliance for each stage of the treatment, and each appliance can be worn for an amount of time prior to switching to the next appliance for the next stage. Each stage may move the teeth progressively towards a desired location in accordance with the treatment plan. However, in some instances one or more teeth may move more slowly than would be ideal. This can result in increased force to the one or more teeth and deformation of the appliance in some instances.

During treatment with patient-removeable appliances, a treatment professional may rely on a patient to comply with the prescribed appliance usage. A dental appliance may undergo degradations of quality over time as the patient uses the appliance. For example, the dental appliance may undergo failures or defects such as warpage, weakening, undesirable deformation, poor edge quality, discoloration, breakage, cracks, etc. Discovering such defects earlier during the treatment may be beneficial to improve outcomes and mitigate delays in the treatment process. However, in some instances, the patient may only visit a treatment professional occasionally, such as when specific stages or milestones are reached or when the treatment is not proceeding according to plan. This can result in deviations from the treatment plan and appliance defects being detected somewhat later than would be ideal.

Prior methods and apparatus for monitoring dental appliance quality may be inadequate in at least some instances. A treatment professional may inspect an appliance occasionally, and patients may not be well-suited to inspect dental appliances for warpage, undesirable deformation, weakening, etc. Issues which may have been detectable earlier may not be noticed until a patient complains, a treatment stage is not achieved, or a treatment professional inspects the appliance. By that time, the issues may have affected the patient's treatment. For example, one or more of the patient's teeth may not have moved enough or may have moved too far which may ultimately cause delays the patient's treatment, or call for a second (e.g., supplemental) treatment plan. While it may be helpful to monitor appliance quality, existing systems make it difficult to do so.

SUMMARY

Described herein are apparatuses and methods for monitoring a dental appliance, including, but not limited to monitoring one or more qualities of the dental appliance. A case for the dental appliance may be configured to monitor the dental appliance. The case may include one or more sensors configured to obtain sensor data which may be analyzed to determine changes in quality of the dental appliance. The case may include and/or be coupled to one or more processors coupled to the sensors and configured to process the sensor data in order to determine quality changes. Advantageously, the systems, methods, and devices herein may provide feasible increased monitoring frequency of the dental appliance to provide timely detection of quality issues. In addition, the increased monitoring may not be disruptive to the patient's usage of the dental appliance.

According to some embodiments, a case for a dental appliance may include a tray for supporting the dental appliance, a cover coupled to the tray, and at least one sensor to detect a deformation of the dental appliance.

In some embodiments, the at least one sensor may be configured to detect the deformation based on tracking contact points of the dental appliance with the at least one sensor.

In some embodiments, the at least one sensor may include a contact sensor on the tray to track relative positions of a plurality of contact points between the dental appliance and the contact sensor over time to detect the deformation. The deformation may be detected based on changes in the relative positions of the plurality of contact points. The deformation may be detected based on changes in a number of the plurality of contact points. The case may further include an accelerometer for determining an orientation of the tray. The relative positions of the plurality of contact points may be tracked based on the orientation. The case plurality of contact points may not be tracked when the tray has a tilted orientation.

In some embodiments, the case may further include a pressure sensor. The pressure sensor may be configured to detect whether the dental appliance is on the tray.

In some embodiments, the at least one sensor may include a digitizer platform. The digitizer platform may include a capacitive sensor to detect each of the plurality contact points and a corresponding location of each of the contact points on the tray. The digitizer platform may include an array of electrodes to detect locations of the plurality of contact points based on an electrical current between the array of electrodes and the plurality of contact points. The at least one sensor may include a conductive sensor configured to detect a plurality of parallel conductive traces on the dental appliance. The digitizer platform may include a digitizer coupled to processor to determine corresponding locations of the plurality of contact points on the tray. The digitizer platform may be configured to detect locations of a plurality of contact points of a polymeric shell appliance. The digitizer platform may be configured to detect locations of each of the plurality of contact points with a spatial resolution finer than about 1 mm.

In some embodiments, the at least one sensor may be configured to detect the deformation based on tracking three-dimensional (3D) points of the dental appliance. The at least one sensor may include an optical sensor. The at least one sensor may include a camera to generate an image of the appliance on the tray and detect the deformation based on the image. The case may further include a light emitter. The optical sensor may be configured to detect a plurality of reflective markers on the dental appliance. The at least one sensor may include a magnetic sensor configured to detect a plurality of magnets on the dental appliance.

In some embodiments, the case may further include a tag reader for identifying the dental appliance. The tag reader may include one or more of a QR code reader, a bar code reader, or an RFID scanner.

In some embodiments, the case may be operatively coupled to a processor configured to determine a treatment modification based on the deformation.

In some embodiments, the case may further include a processor operatively coupled to the at least one sensor to determine a first shape of the appliance at a first time and a second shape of the appliance at a second time and to detect the deformation based on a difference between the first shape and the second shape. The processor may include one or more of a processor supported with the tray or a remote server. The processor may include instructions to detect deformation of the appliance in response to a difference in relative locations of a plurality of contact points. The first shape may include a first number of contact points and a second shape may include a second number of contact points. The processor may include instructions to detect deformation of the appliance in response to a difference between the first number of contact points and the second number of contact points. The processor may include instructions to determine an orientation of the appliance. The orientation may include a first orientation corresponding to an occlusal side of the appliance contacting the tray and a second orientation corresponding to a gingival side of the appliance contacting the tray. The processor may include instructions to determine a plurality of shapes of the appliance over a plurality of days. The processor may be configured to detect deformation of the appliance.

According to some embodiments, a case for a dental appliance may include a tray for housing the dental appliance, a cover coupled to the tray, and at least one sensor configured to detect a change in material of the dental appliance.

In some embodiments, the at least one sensor may include an optical sensor. The optical sensor may be configured to detect the change in material based on reflectivity. The optical sensor may be configured to detect the change in material based on light scattering. The optical sensor may be configured to detect the change in material based on color. The optical sensor may be configured to detect the change in material based on detecting a color change of an indicator on the dental appliance.

In some embodiments, the at least one sensor may include a capacitive sensor configured to detect a dielectric property of the dental appliance.

In some embodiments, the case may further include a tag reader for identifying the dental appliance. The tag reader may include a QR code reader. The tag reader may include an RFID scanner.

In some embodiments, the case may further include a processor operatively coupled to the at least one sensor to determine a first material property of the appliance at a first time and a second material property of the appliance at a second time and to detect the change in material property based on a difference between the first material property and the second material property. The processor may include one or more of a processor supported with the tray or a remote server. The processor may include instructions to measure the material property of the appliance over a plurality of days. The processor may be configured to determine the difference in the material property based on changes over the plurality of days.

INCORPORATION BY REFERENCE

All patents, applications, and publications referred to and identified herein are hereby incorporated by reference in their entirety, and shall be considered fully incorporated by reference even though referred to elsewhere in the application.

BRIEF DESCRIPTION OF THE DRAWINGS

A better understanding of the features, advantages and principles of the present disclosure will be obtained by reference to the following detailed description that sets forth illustrative embodiments, and the accompanying drawings of which:

FIGS. 4A to 4D show a definition of a contact signature, in accordance with some embodiments;

FIGS. 5A to 5C show a change over time in a contact signature, in accordance with some embodiments;

FIGS. 6A to 6B show detection of a case orientation, in accordance with some embodiments;

DETAILED DESCRIPTION

The following detailed description and provides a better understanding of the features and advantages of the inventions described in the present disclosure in accordance with the embodiments disclosed herein. Although the detailed description includes many specific embodiments, these are provided by way of example only and should not be construed as limiting the scope of the inventions disclosed herein. The methods, apparatus, dental appliances, and cases disclosed herein may be well suited for combination with many dental appliances and applications, such as an aligner for aligning a plurality of teeth, a retainer, a palatal expander, a bracket for placing attachments on a plurality of teeth, an attachment for coupling to teeth, a nightguard, a functional appliance, and other oral appliances. The presently disclosed methods, apparatus and appliances are well suited for monitoring (aka tracking) a quality of a dental appliance using one or more sensors embedded, attached, and/or coupled to a case for the dental appliance. A quality of a dental appliance, as used herein, may include features and/or characteristics that define the dental appliance and/or allow the dental appliance to perform according to its intended purpose. For aligners and retainers, the quality of a dental appliance may be based on physical and/or geometrical properties, such as the extent the geometry of an aligner or retainer deviates from its intended shape. The quality of a dental appliance may be based on various factors, such as the extent the dental appliance exhibits deformation, warpage, or changes in material due to various factors, such as patient usage, factors related to manufacturing, factors related to shipping, factors due to the environment in which the dental appliance is used, etc. The methods and apparatus disclosed herein are well suited for combination with various dental appliances, such as aligners, including aligners commercially available from Align Technology, Inc., orthodontic retainers, and other orthodontic appliances.

Figure 1:
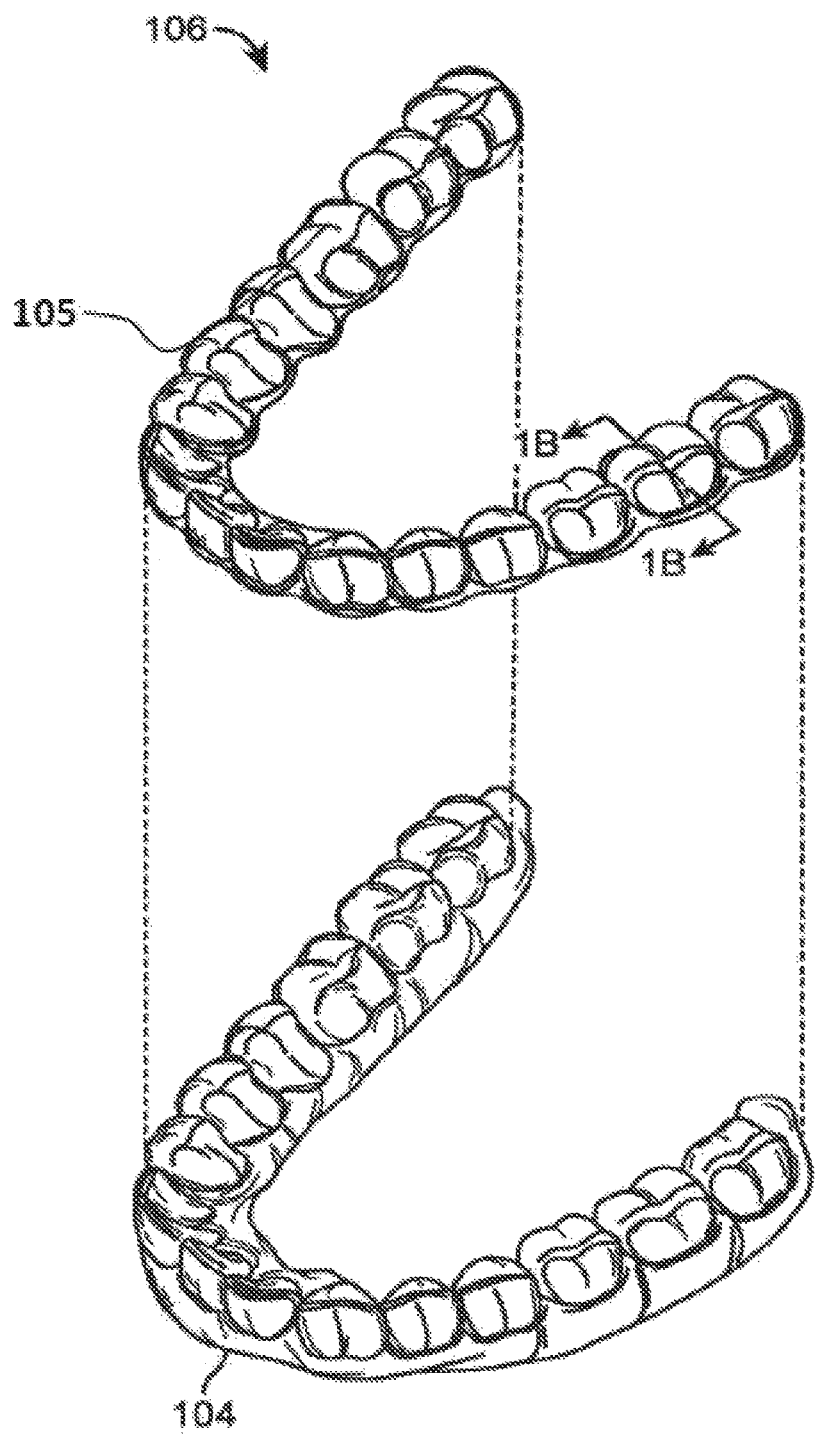
FIG. 1 shows, a dental appliance, in accordance with some embodiments.
Figure 2:
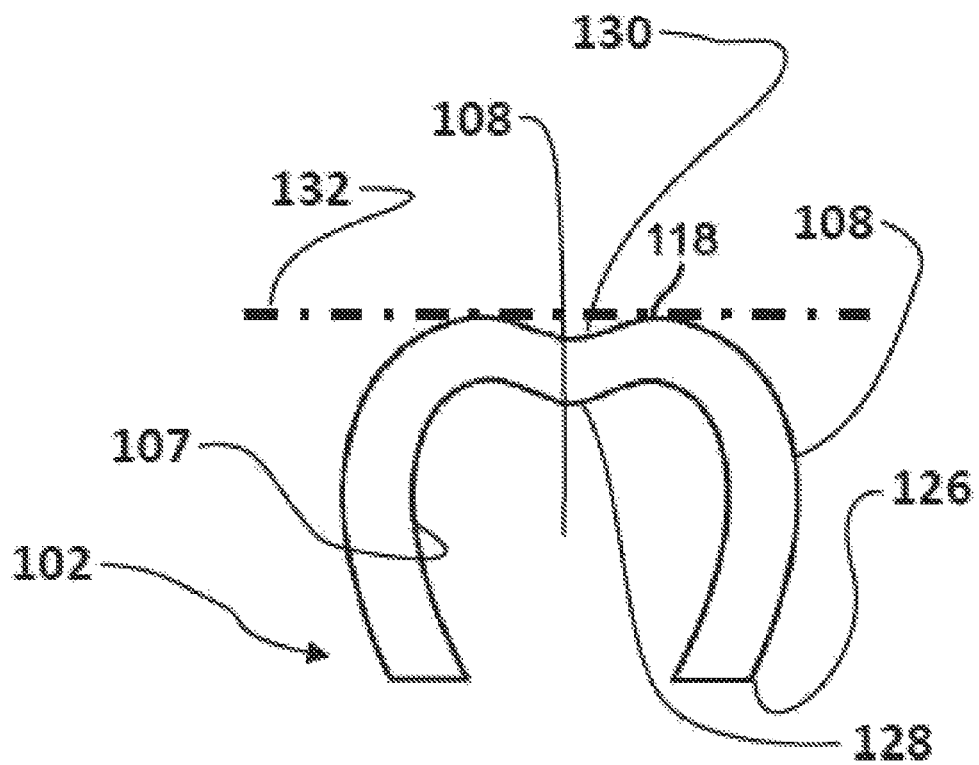
FIG. 2 shows the cross-section of the dental appliance from FIG. 1, in accordance with some embodiments.

FIG. 1 illustrates an exemplary dental appliance 106 and jaw 104 including a patient's teeth. FIG. 2 illustrates dental appliance cross-section 118 of the dental appliance 106 as taken along line 1B-1B of FIG. 1. The dental appliance 106 may be sized and shaped to fit over and resiliently reposition a plurality of teeth present in an upper or lower jaw. The dental appliance 106 may comprise a polymeric shell appliance having a thickness suitable for repositioning a plurality of teeth. In some embodiments, the polymeric shell thickness may be no more than about 2 millimeters, and, in some embodiments, the polymeric shell may thickness may be with a range from about 0.2 millimeter to about 2 millimeters, 0.4 mm to about 1.6 mm, 0.6 mm to about 1.4 mm, 0.8 mm to about 1.2 mm, etc. The polymeric shell may comprise a plurality of layers. As illustrated, the dental appliance 106 has a generally U-shaped cross-section 118 to form one or more teeth receiving cavities 109 shaped to receive and resiliently reposition one or more teeth of a patient, e.g., one or more teeth of the jaw 104. The dental appliance 106 may comprise a thickness extending between an interior surface 107 shaped to receive a tooth and the exterior surface 108 facing away from the tooth. In some embodiments, the exterior surface 108 comprises an occlusal surface 105 to engage an opposing appliance or opposing teeth on an opposite side of the mouth. The occlusal surface 105 of appliance 106 may extend along an occlusal plane 132. The methods and apparatus disclosed herein may be used to fabricate the dental appliance 106 with various additive manufacturing and/or thermoforming techniques.

Although the cross-section shown in FIG. 2 shows a portion of the appliance extending across the tooth, in some embodiments, the appliance extends between teeth. The dimensions of the cross-section of the appliance can vary in accordance with the shape of patient's teeth. For example, an exterior surface of the appliance may protrude outwardly near a midline of a tooth, and intrude slightly at mesial locations near a space between teeth. The methods, apparatus and appliances disclosed herein are well suited for addressing variations in geometry of a patient's dentition.

Although the embodiment of FIG. 1 illustrates a dental appliance in the form of an aligner, other types of dental appliances are suitable for use. For example, dental appliance 106 may comprise a retainer, a palatal expander, a bracket for placing attachments on a plurality of teeth, an attachment for coupling to teeth, a nightguard, a functional appliance, or a directly fabricated aligner thermoforming mold.

Figure 3A:
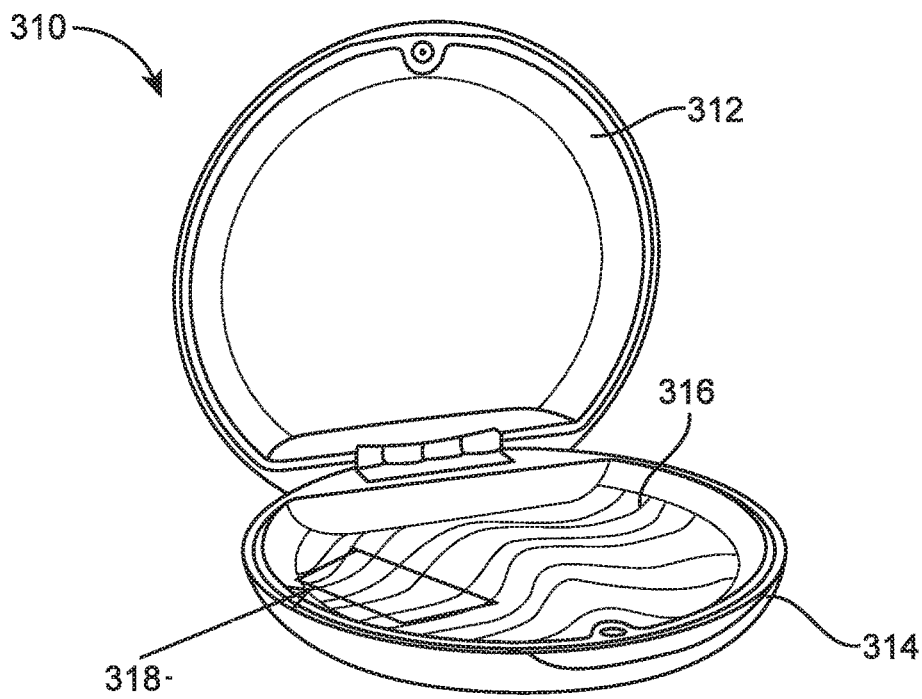
FIGS. 3A to 3B show a case for use with a dental appliance, in accordance with some embodiments.
Figure 3B:
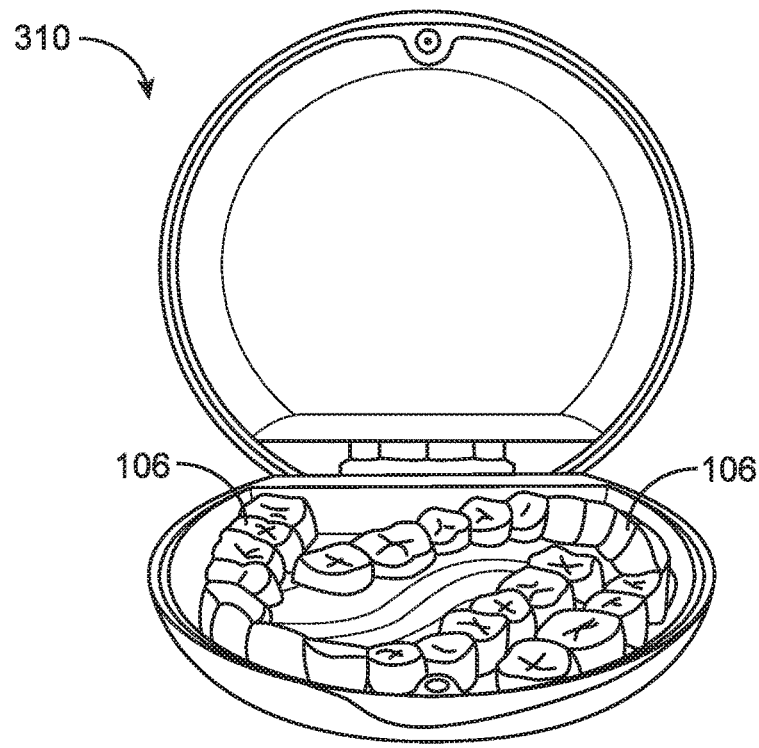

FIGS. 3A-3B illustrate an exemplary case for housing a dental appliance which may detect a quality of the dental appliance. A case 310 may include a cover 312 and a tray 314. The tray 314 may hold a digitizer platform 316 which may be positioned on a base or floor of the tray 314. As will be discussed further below, the digitizer platform 316 may track quality of the dental appliance 106. Although not visible in FIG. 3A, the case 310 may include sensors 318, such as an optical sensor, a camera, a magnetic sensor, a Hall effect sensor, a tag reader, a QR code reader, a bar code reader, and/or an RFID scanner. The sensors 318 may be coupled to and/or embedded in and/or around the case 310, such as in the cover 312, the tray 314, and/or the digitizer platform 316. The case 310 may include a processor, memory, and/or other components of a computer system coupled to the digitizer platform 316 and the sensors 318, and may further be coupled to a computing device, such as a remote server, smartphone, etc., through wired and/or wireless connections. An example of the processor, memory, and/or other components may be found in FIG. 11.

In addition, although quality detection of a single dental appliance is discussed herein, multiple dental appliances may be housed and/or detected within a container, such as case 310 holding multiple dental appliances 106 in FIG. 3B which may correspond to the patient's upper and lower jaws.

Dental appliances may exhibit warpage over time. As the dental appliance 106 is used, various forces may act on and/or against surfaces of the dental appliance 106. For example, physical resistance from teeth to be shaped, temperature fluctuations during storage, and/or other forces may cause degradation or other changes to a quality of the dental appliance 106. Thus, a shape of the dental appliance 106 may be tracked. Deformations to the shape may be detected by determining a difference between a first shape at a first time compared to a second shape at a second time. For instance, the shapes may be detected over multiple days in order to detect deformations. Various other attributes, such as material quality, cleanliness, shape, etc. may also be detected by the sensors 318 of the case 310.

The digitizer platform 316 may detect a shape of the dental appliance 106. For instance, contact points of the dental appliance 106 against a flat, detection surface of the digitizer platform 316 may establish a contact signature of the dental appliance 106. "Contact points," as used herein, may include a set of locations at which the dental appliance 106 physically touches the digitizer platform 316. The contact points may comprise a continuous contact curve along which the dental appliance 106 contacts the digitizer platform 316. In some embodiments, the contact points may comprise a discrete set of points disconnected from one another, but when evaluated, can be used to construct a pattern of contact by the dental appliance 106 against the digital platform 316. As noted herein, the pattern of contact may be used to infer a contact curve, e.g., a one-dimensional curve formed by interpolating locations of contact points based on one or more properties of the dental appliance 106. A "contact signature," as used herein, may include a set of contact points and/or a contact curve that is consistent with physical properties of the dental appliance 106. A contact signature may be associated with (e.g., unique to) the geometry of the dental appliance 106. In some embodiments, a contact signature may comprise a planar contact signature, e.g., a two-dimensional region formed from a set of points and/or curves that is consistent with the physical/geometrical properties of the dental appliance 106.

The digitizer platform 316 may comprise a touch sensor such as a capacitive sensor and/or other contact sensor capable of detecting multiple planar contact points. The digitizer platform 316 may be configured to detect contact points from the material of the dental appliance 106, such as a polymeric shell appliance. The contact points may correspond to the lowest points on teeth, such as the centers of the crowns. The distances between center points may be, for instance 4 mm to 8 mm for molars, 3 mm to 6 mm, etc. The digitizer platform 316 may therefore be configured to detect locations of the contact points with a sufficient spatial resolution that may be finer than, for example, about 1 mm or less. In some implementations, the digitizer platform 316 may include a set (e.g., an array) of electrodes which may detect locations of the contact points based on an electrical current between the electrodes and the contact points. For instance, the digitizer platform 316 may include a conductive sensor configured to detect patterns of conductive traces on the dental appliance 106. The conductive traces may be, for example, small beads which may be detected to determine locations of the conductive traces. In some embodiments, the patterns of conductive traces comprise parallel conductive traces.

FIG. 4A illustrates the dental appliance 106 resting on the digitizer platform 316. The dental appliance 106 may not sit flush against the digitizer platform 316 due to the ridges, valleys, protrusions, and/or other geometrical properties in the shape of the dental appliance 106. These various attributes of the dental appliance 106 may contact the digitizer platform 316 at contact points 426, that in turn may be detected by the digitizer platform 316. These contact points 426 may define a contact signature of the dental appliance 106. Over time, as the dental appliance 106 exhibits warpage, the contact points 426 may shift relative to each other. Thus, tracking the contact signature over time may reveal deformations to the dental appliance 106.

In some embodiments, the contact points 426 may be detected and/or represented by one or more coordinate systems. As an example, the contact points 426 may be detected and/or represented by Cartesian coordinates, as illustrated in FIG. 4B. For example, each contact point 426 may have its own (x, y) coordinates. A contact signature 428 may therefore be represented, in a simplistic model, by a collection of coordinates. To facilitate comparison between various iterations of contact signatures 428, the contact points 426 may be further organized into a specific order. The contact points 426 may generally fit along a curve 427. The curve 427 may correspond to a general U-shape of the dental appliance 106, although in other implementations the curve 427 may comprise other shapes. Thus, the contact points 426 may be ordered along the U-shape. For instance, the contact point 426 at the top left of the U-shape may be p1, the next nearest contact point 426 along the U-shape may be p2, etc. until a last point pn. Using regression analysis and/or other similar curve recognition schemes, the points may be identified (e.g., p1, p2, . . . pn). The regression analysis may further account for variations of the orientation of the U-shape, for instance if the contact points 426 followed an upside U-shape, such that the same point along the same relative location along the U-shape may be similarly identified. A subsequently detected contact signature 428 having a different number of points may indicate a deformation.

The digitizer platform 316 may detect the contact points 426 based on coordinates relative to the digitizer platform 316. Thus, if the dental appliance 106 is not placed in the exact same location with respect to the digitizer platform 316, the coordinates for the contact points 426 may differ, even if the shape of the dental appliance 106 remains unchanged. For instance, FIG. 4C illustrates the same contact signature 428 as shown in FIG. 4B shifted with respect to the coordinate system of the digitizer platform 316. As seen in FIG. 3B, the size of the tray 314 may allow the dental appliance 106 to be placed in various orientations and/or locations on top of the digitizer platform 316. However, a strict coordinate comparison between corresponding points (e.g., p1 of first and second contact signature reading) of contact signatures 428 may reveal shifted coordinates. It may be impractical to require the dental appliance 106 to be consistently placed in the same location on the digitizer platform 316. Therefore, tracking the relative positions between the contact points 426 may be allow the tracking to be position-independent with respect to the case 310. The dental appliance 106 may be placed anywhere on the digitizer platform 316 as long as the dental appliance 106 is fully within the case 310.

As illustrated in FIG. 4D, the contact signature 428 may be represented as a set of vectors between the contact points 426. Following the contact point organization along the curve 427 as discussed above, vector $p^{1/2}$ may be a vector from point p1 to point p2, vector $p^{2/3}$ may be a vector from point p2 to point p3, etc. In FIG. 4C, the coordinates of the points p1 . . . pn may have shifted (e.g., due to placement on a different location on the digitizer platform 316), but the locations of the contact points 426 with respect to each other, as represented by vectors $p^{1/2} \ldots p^{n-1/n}$, may be the same, indicating the same contact signature 428.

FIGS. 5A-5C illustrate how contact signature 528 may be tracked over time. In FIG. 5A, at a first time, contact points 526 of contact signature 528 may have specific positions with respect to each other. In FIG. 5B, at a second time after the first time, one point (e.g., the upper right point) may have shifted with respect to other points (e.g., the upper left point and the middle point) as compared to FIG. 5A. In FIG. 5C, at a third time after the second time, additional points (e.g., the upper left point and the middle point) may have shifted with respect to another point (e.g., the upper right point) as compared to FIG. 5B. Thus, changes between each contact signature reading (e.g., between FIG. 5A and FIG. 5B and between FIG. 5B and FIG. 5C) may be tracked as well as changes between non-consecutive readings (e.g., between FIG. 5A and FIG. 5C).

The contact signature 528 may correspond to the shape of the dental appliance 106 in that changes to the shape may be reflected in changes to the contact signature 528. For example, as illustrated in FIGS. 5A-5C, changes to the relative locations of the contact points 526 may indicate changes to the shape such that a processor coupled to the digitizer platform 316 may detect a deformation when differences in the relative locations of the contact points 526 are detected. Other changes, such as a difference between a first number of contact points and a second number of contact points, may also indicate a deformation.

To further ensure consistent and accurate readings over time, the case 310 may include sensors 318 which may detect suboptimal conditions for detecting contact signatures. For instance, the sensors 318 may include an accelerometer and/or other sensors capable of detecting an orientation of the case 310. If the case 310 is tilted during a contact signature reading, the dental appliance 106 may shift such that certain contact points may not be accurately detected by the digitizer platform. In a worst-case scenario, the case 310 may be orientated such that the dental appliance does not contact the digitizer platform, such as if the case 310 was on its side or upside down.

FIGS. 6A-6B illustrate an orientation 629 of the case 310. The orientation 629 may indicate how parallel the ground the case 310 is orientated. In other words, the orientation 629 may indicate how perpendicular a plane 311, corresponding to a level plane of the case 310 and the digitizer platform 316, is with respect to a downward or gravitational direction. In FIG. 6A, the orientation 629 may be considered level. For instance, the orientation 629 may be within a threshold distance from a level orientation indicating that the plane 311 is coplanar with the ground plane. Thus, in FIG. 6A a relatively accurate contact signature reading may be obtained.

In FIG. 6B, the orientation 629 may not be level. For example, the orientation 629 may be outside the threshold distance from the level orientation. When the case 310 is tilted as such, an accurate contact signature reading may not be obtained. In some implementations, the digitizer platform 316 may not record a contact signature when the orientation 629 is not considered level. For instance, the contact points may not be tracked when the case 310 has a tilted orientation. In some implementations, the user may be notified that the case 310 is not level, for instance by a visual indicator on the case 310 or through a notification via a connected computing device. In certain implementations, the digitizer platform 316 may account for the orientation 629. For instance, the contact points may be further tracked based on the orientation 629. The contact signature may be estimated as if the case 310 were level. In certain implementations, the case 310 may include, for instance in the cover 312, a mechanical device for ensuring consistent contact between the dental appliance 106 and the digitizer platform 316.

The digitizer platform 316 and/or sensors 318 may further include a pressure sensor. The pressure sensor may detect whether the dental appliance 106 is on the tray 314. For example, the pressure sensor may detect whether an object has been placed on the tray 314 before activating the capacitive sensor of the digitizer platform 316. The pressure sensor may determine whether the dental appliance 106 or another foreign object has been placed on the tray 314, such as by detecting an expected weight and/or surface area of contact. In some implementations, the digitizer platform 316 may make a contact signature reading when the pressure sensor indicates the presence of an object and the accelerometer detects that the case 310 is level.

The case 310 may be configured to identify the dental appliance 106, for instance to distinguish between different dental appliances. The sensors 318 may include a tag reader for identifying the dental appliance 106. For example, the tag reader may be a QR code reader, a bar code reader, an RFID scanner, etc. for detecting an identifier (e.g., a QR code, a bar code, an RFID tag, etc.) on the dental appliance 106.

Identifying the dental appliance 106 may further include identifying an orientation of the dental appliance 106. For instance, the case 310 and/or the processor coupled thereto may recognize at least a first orientation of the dental appliance 106 corresponding to an occlusal side of the dental appliance 106 contacting the tray 314 and at least a second orientation corresponding to a gingival side of the dental appliance 106 contacting the tray 314. In certain implementations, the first and second orientations may be detected based on distinct contact signatures between the two orientations. For example, the contact signatures of the first and second orientations may differ beyond a threshold indicating possible deformations, such as differences in a number of contact points not normally expected as a result of warpage. In other implementations, the identifier tag may include orientation information or may otherwise be sensitive to orientation, such as an optical tag indicating a direction. In yet other implementations, the case 310 may be capable of detecting a three-dimensional (3D) shape of the dental appliance 106, as will be explained further below. In these implementations, the case 310 may recognize the orientation based on the 3D shape.

Figure 7A:
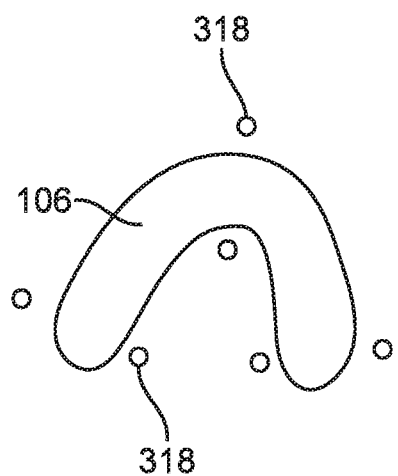
FIGS. 7A to 7C show tracking a 3D signature over time, in accordance with some embodiments.
Figure 7B:
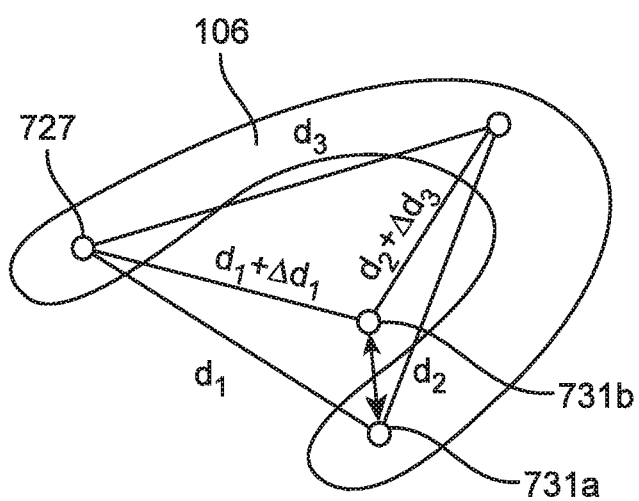

The sensors 318 of the case 310 may include sensors which may track 3D points on the dental appliance 106. In FIGS. 7A and 7B, the sensors 318 may be placed in the case 310 to be around the dental appliance 106 when the dental appliance 106 is within the case 310. The 3D points may be identified by markers 727. The markers 717 may be active and/or passive components. Active components may include, for instance, sensors which may detect and broadcast its own location. Passive components may include optical markers, magnets, and/or other components which may be activated or actively sensed when within the case 310. For example, the sensors 318 may include optical sensors, such as a camera which may generate an image of the dental appliance 106 on the tray 314 in order to detect deformations based on the image. The markers 727 may be reflective markers to be more consistently detected by optical sensors. In such implementations, the case 310 may include a light emitter to reflect light off the markers 727 and be detected by the sensors 318. The images may be analyzed, using image analysis, to determine spatial locations of the markers 727. For example, color intensities, differences in brightness, etc. may be used to determine deformation, strain, depth and spatial locations. The sensors 318 may include additional sensors, such as optical, laser, IR, and/or radio sensors, to assist in depth perception and other spatial awareness detection. The image analysis may further be used to identify the dental appliance 106 as well as the orientation of the dental appliance 106.

Similar to the planar contact signature described above, a 3D signature may be defined by relative locations between the markers 727. For example, in FIG. 7B, 3D distance vectors d1, d2, and d3 between the markers 727 may be determined to define the 3D signature. At a subsequent 3D signature reading, the marker 731a may have shifted to a marker 732b. The shift may be detected based on changes to the distance vectors. For example, d1 may have changed by a Δd1 and d2 may have changed by a Δd2. The deltas may be indicative of one or more deformations in the dental appliance 106.

Figure 7C:
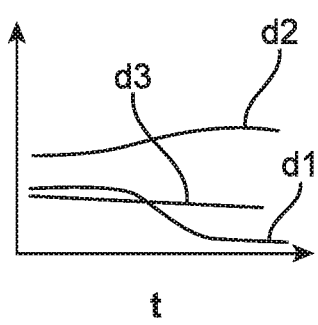

FIG. 7C illustrates a graphical way of tracking changes to the 3D signature. The markers 727 may be monitored over time for changes. Specific changes, such as changes in particular magnitudes and/or particular directions, particular combinations of changes, etc., may be indicative of particular deformations. For instance, particular deformations may correspond to particular tooth locations. In some implementations, the case 310 and/or the processor coupled thereto may be configured to determine a treatment modification based on detected deformations. For example, during treatment, one or more particular deformations (e.g., deformations with respect to specific tooth locations) may be expected at particular times (e.g., a specified number and/or range of days from a start of the treatment) for successful treatment. Deviations from the particular deformations at the expected particular times may indicate that the treatment may need to be modified.

The expected deformations may be tracked based on expected locations of the markers 727 and/or contact points 426, 526. For example, the treatment may expect the markers 727 and/or contact points 426, 526 to have specific relative locations at particular times during the treatment. If the specific relative locations, within a tolerance threshold, are not detected at the expected time, the corresponding tooth may not have moved as expected for the treatment. The patient and/or treatment professional may be alerted based on a type and/or magnitude of deviation from the expected deformation.

Figure 8:
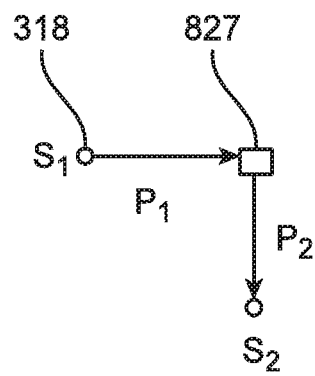
FIG. 8 shows magnetic sensors in accordance with some embodiments.

The sensors 318 may include proximity sensors for detecting proximities of the markers 727. In FIG. 8, the sensors 318 may include a magnetic sensor, such as a Hall effect sensor. The markers 827 may be magnets or magnetic markers. The sensors 318 may detect the 3D locations of the markers 827 with respect to the sensors 318. The sensors 318 may detect the distances based on a magnitude and orientation of a magnetic field of the marker 827. For instance, sensor s1 may detect a distance p1 of the marker 827 from the sensor s1. Similarly, sensor s2 may detect a distance p2 of the marker 827 from the sensor s2. Based on p1, p2, and the known locations of the sensors s1 and s2, the 3D location of the marker 827 may be determined. The relative locations between markers 827 may then be determined for the 3D signature, and changes to the 3D signature may be tracked to detect deformations in the dental appliance 106 as described herein.

In certain implementations, rather than tracking a plurality of points (e.g., the contact points 426, 526, and/or the markers 727), a single point, such as a weighted midpoint of the markers and/or contact points, may be determined and tracked. Thus, changes to any of the points may be reflected in a change to the midpoint. The midpoint may be weighted based on, for instance, a detected weight or mass of the dental appliance.

Although the shape of the dental appliance 106 may be tracked based on specific points (e.g., the contact points 426, 526 and/or the markers 727), in certain implementations, granular changes to the shape may be detected by tracking the overall shape of the dental appliance 106. For example, computer vision may be used with the image analysis described herein to recognize the shape. Computer vision may be used to create a 3D map of the dental appliance. The granularity of such detection may be based on a number of 3D points detected.

The case 310 and/or the processor coupled thereto may also be configured to detect changes to other qualities, such as one or more other material properties of the dental appliance 106, instead of and/or in addition to shape. The material property may include one or more of material composition, hardness and/or resiliency, and other properties which may indicate degradation of the dental appliance 106. The case 310, using the sensors 318, may detect a first material property at a first time and a second material property at a second time and to determine a change based on a difference between the first material property and the second material property. The material property may be measured, for instance, over multiple days. The material property may be a material composition of the dental application 106. Alternatively, rather than specifically detecting a material composition, changes in the material composition, such as changes from an initial reading, may be detected. Alternatively, sensor data from the sensors 318 may be correlated to known properties of known materials. Changes to qualities of the dental appliance 106 may be monitored, for instance, to provide feedback to the patient and/or treatment professional and further provide alerts when action and/or modification to the treatment are needed.

The sensors 318 may include, for example, an optical sensor. As described herein, the optical sensor may be used to detect warpage such as deformations. The optical sensor may also be configured to detect changes to the material properties based on reflectivity. For example, the dental appliance 106 may be made of a specific known material which may be expected to exhibit a corresponding known reflectivity. The known reflectivity may correspond to a predetermined value (such as an empirically determined value or other reference value) or may correspond to an initial measurement at the start of the treatment. Changes to the material property may be indicated by deviation of the measured reflectivity beyond a reflectivity threshold. In some embodiments, the deformation of and/or strain in the dental appliance 106 may be measured using birefringence, as discussed below with reference to FIGS. 10A to 10D.

Alternatively and/or in addition to reflectivity, the optical sensor may be configured to detect changes based on light scattering. Changes to the material property may be indicated by a deviation of a measured light scattering beyond a scattering threshold from a reference scattering measurement. The reference scattering measurement may be based on a predetermined value (such as an empirically determined value or other reference value) or may correspond to an initial measurement at the start of the treatment. For example, as the dental appliance 106 wears down, its surface may deteriorate and change its light scattering properties.

The optical sensor may be configured to detect changes based on color. Changes to the material property may be indicated by a deviation of a measured color beyond a color threshold from a reference color. The reference color may be based on a predetermined value (such as an empirically determined value or other reference value) or may correspond to an initial measurement at the start of the treatment. For example, as the dental appliance 106 wears down, the material may change in material composition (e.g., absorb foreign materials and/or expel material) which may result in changes to its color.

The optical sensor may be configured to detect changes based on detecting a color change of an indicator on the dental appliance 106. For example, a reactive indicator may change color in the presence of certain agents, which may further be indicative of a change to the material. For instance, one or more indicators may be configured to react to specific compounds (e.g., chemical byproducts from material degradation and/or reactions to other materials, pH, etc.). Changes to the material property may be indicated by the color change of the indicator beyond an indicator threshold from a reference indicator color. The reference indicator color may be based on a predetermined value (such as an empirically determined value or other reference value) or may correspond to an initial measurement at the start of the treatment.

The sensors 318 may include a capacitive sensor configured to detect a dielectric property of the dental appliance 106. Changes to the material property may be indicated by a deviation of a measured dielectric property beyond a dielectric threshold from a reference dielectric property measurement. The reference dielectric property measurement may be based on a predetermined value (such as an empirically determined value or other reference value) or may correspond to an initial measurement at the start of the treatment.

Figure 10A:
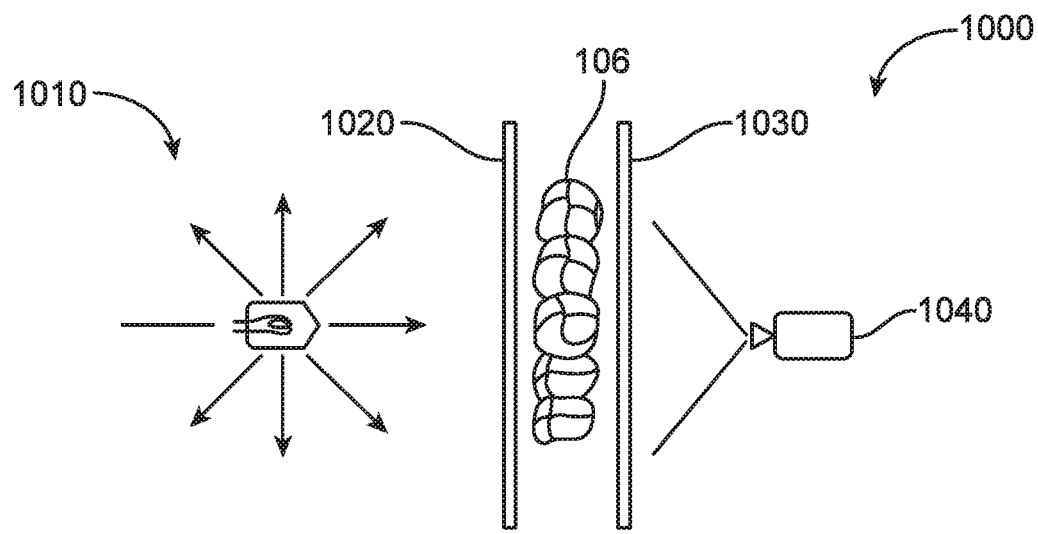
FIGS. 10A to 10B show systems for observing changes in dental appliance strain using birefringence, in accordance with embodiments.
Figure 10B:
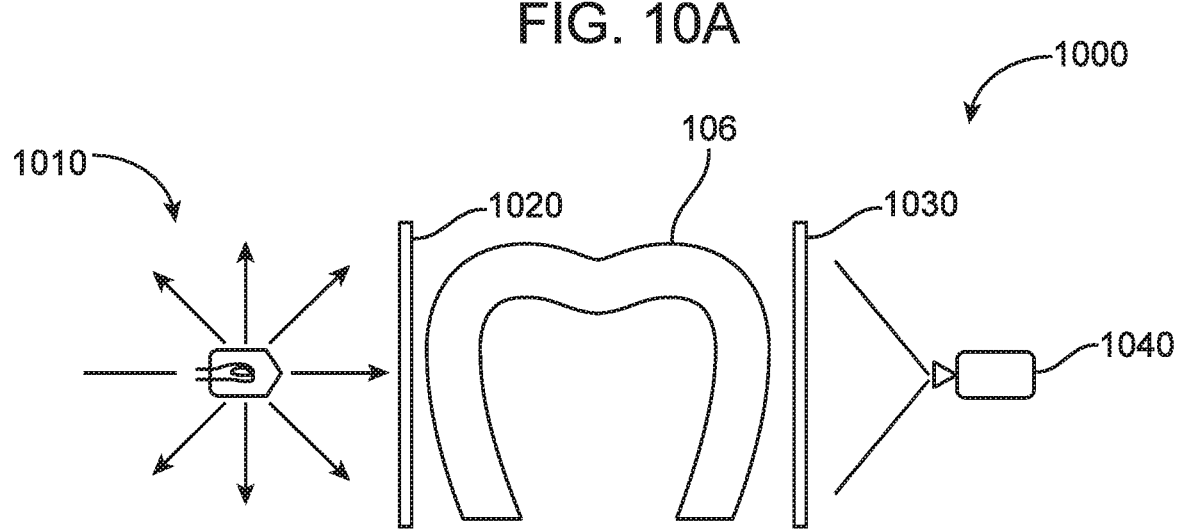

FIGS. 10A to 10B depicts a system 1000 for observing birefringence in a dental appliance 106 and the resulting observed birefringence pattern 1050. Birefringence is an optical property of a material having a refractive index that depends on the polarization and propagation direction of light passing though it. Polymer materials, such as those used in dental appliances may exhibit birefringence. The patterns and intensity of observed birefringence in a dental appliance may change based on the strain within the dental appliance. The strain in appliance changes the polymer structure, for example, by stretching or relaxing the polymer chains that make up the material of the dental appliance. By observing these changes in the birefringence of a dental appliance a determination may be made as to whether and appliance is overstrained and should be replaced. Birefringence patterns may be observed by illuminating the dental appliance with white light, placing a polarizing filter between the illumination source and the dental appliance, placing a second polarizing filter oriented 90° to the first polarizing filter, and observing the appliance through the second polarizing filter.

In FIG. 10A, the system 1000 includes a light source 1010, a first polarizing filter 1020, a dental appliance 1006, a second polarizing filter 1030, and a sensor 1040 (e.g., an optical sensor, camera, etc.). The light source 1010 provides white light or other broad spectrum visible light illumination projected towards the appliance. The projected light is polarized by the first polarizing filter 1020. The polarized light then passes through the dental appliance 106 where it is refracted by the dental appliance. Light projected though the dental appliance then passes through the second polarizing filter 1030. The second polarizing filter 1030 is oriented 90° from the polarizing filter 1020 such that the second polarizing filter 1030 polarizes light orthogonally to the polarization of the first polarizing filter 1020. The birefringence pattern of the dental appliance 1006 may then be observed or recorded by a sensor such as the camera 1040.

In some embodiments, the system 1000 may be implemented in an appliance case such as appliance case 310. In such an embodiment, a light source and first polarizing filter may be integrated into one or the other of a cover 312 and the tray 314 and the second polarizing filter may be incorporated in the other of the cover 312 and the tray 314. A sensor (e.g., camera, other optical sensor, etc.) may also be located in the other of the cover 312 in the tray 314. In some embodiments, the light source may be an ambient light source, such as lights in a room or natural light. In such embodiments, the appliance case may be made from clear, semitranslucent, or translucent material. In some embodiments the light source may include backlighting structures such as LED backlighting or other light sources. In some embodiments, the light sources may include light guides or light pipes formed in the cover or tray. As discussed above, the first polarizer 1020 and the second polarizer 1030 are oriented 90° with respect to each other. Such an arrangement of light source and sensor in opposite sides of the case 310 may allow observation of birefringence patterns through the occlusal surface of the appliance 106.

FIG. 10B shows a system 1000 for the observation of birefringence patterns in buccal and lingual sidewalls of the dental appliance 106. In FIG. 10B, the light source 1010 and the first polarizer 1020 are located on a first side of a tooth receiving cavity of the dental appliance 106, for example a lingual side, while the second polarizer 1030 and the camera 1040 are located on a second side of the tooth receiving cavity of the dental appliance 106, for example a buccal side. In such an arrangement, light from the light source 1010 is polarized at a first angle by the first polarizer 1020 and then projected through the appliance, and then through the second polarizer 1030 that is oriented 90° to the first polarizer 1020. The camera 1040 may observe the birefringence pattern in the dental appliance 106 through the second polarizer 1030.

The arrangement shown in FIG. 10B may be implemented in a dental appliance case, such as case 310 by placing the light source and first polarizer in a central location of the case. For example, in a location such that when the dental appliance 106 is placed within the case, the light source and polarizer are within the U of the U-shaped dental appliance 106, such as between left and right molar tooth receiving cavities of the dental appliance 106. A second polarizer 1030 and one or more cameras 1040 may be placed about the outside or sidewalls the case 310. In some embodiments, the location of the light source and first polarizer may be about the outside or sidewalls of the case 310 while the second polarizer and sensor or camera 1040 is located within the U of the U-shaped dental appliance 106.

In some embodiments the light source may be a polarized light source and the first polarizer 1020 may be omitted. Similarly, the second polarizer 1030 may be integrated into the sensor or camera 1040.

In some embodiments, it may be desirable to know the location of the birefringence pattern and associated strain in the appliance 106. For example, the systems and methods described herein for determining the orientation of the dental appliance 106 within the case 310 may be used in combination with a known or determined position of the camera 1040 in order to determine the portion or portions of the dental appliance 106 in an image captured by the camera 1040. In some embodiments, other methods may be used to determine the portion or portions of the dental appliance 106 and the captured image along with the location of the birefringence patterns observed in the dental appliance 106. For example, edge detection, computer vision, and/or machine learning techniques may be used to determine the portion or portions of the appliance within the field of view of the camera and the locations of the birefringence patterns in the dental appliance 106.

Figure 10C:
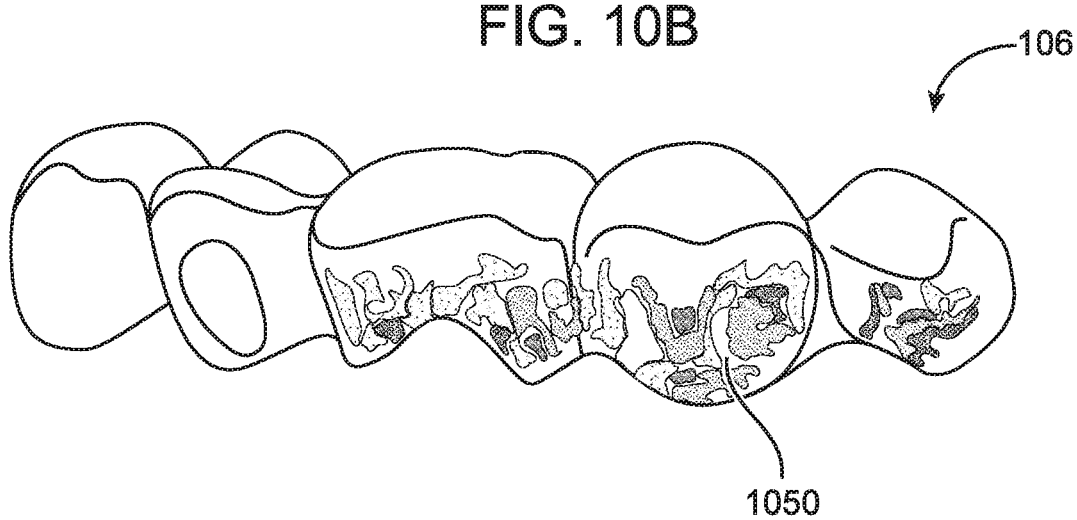
FIG. 10C shows an example image of a birefringence pattern observed using the techniques described herein, in accordance with some embodiments.

FIG. 10C shows an example image of a birefringence pattern observed using the techniques described herein. The birefringence pattern 1050 is observable as changes in gradients and intensity of color in the aligner. Observation of changes in birefringence patterns over time may show locations of increased strain within the aligner, for example, at inter-proximal areas between adjacent tooth receiving cavities or on sidewalls or occlusal surfaces of the cavities. In some embodiments, increased strain may be observed by changes in the birefringence pattern near attachment receiving cavities within the appliance. Changed strain may indicate a change in quality of the dental appliance, such a decrease in the dental appliance's effectiveness in moving teeth, and may result in changes to the patient's treatment plan, for example changing aligners early, among other changes to the treatment plan.

Figure 9:
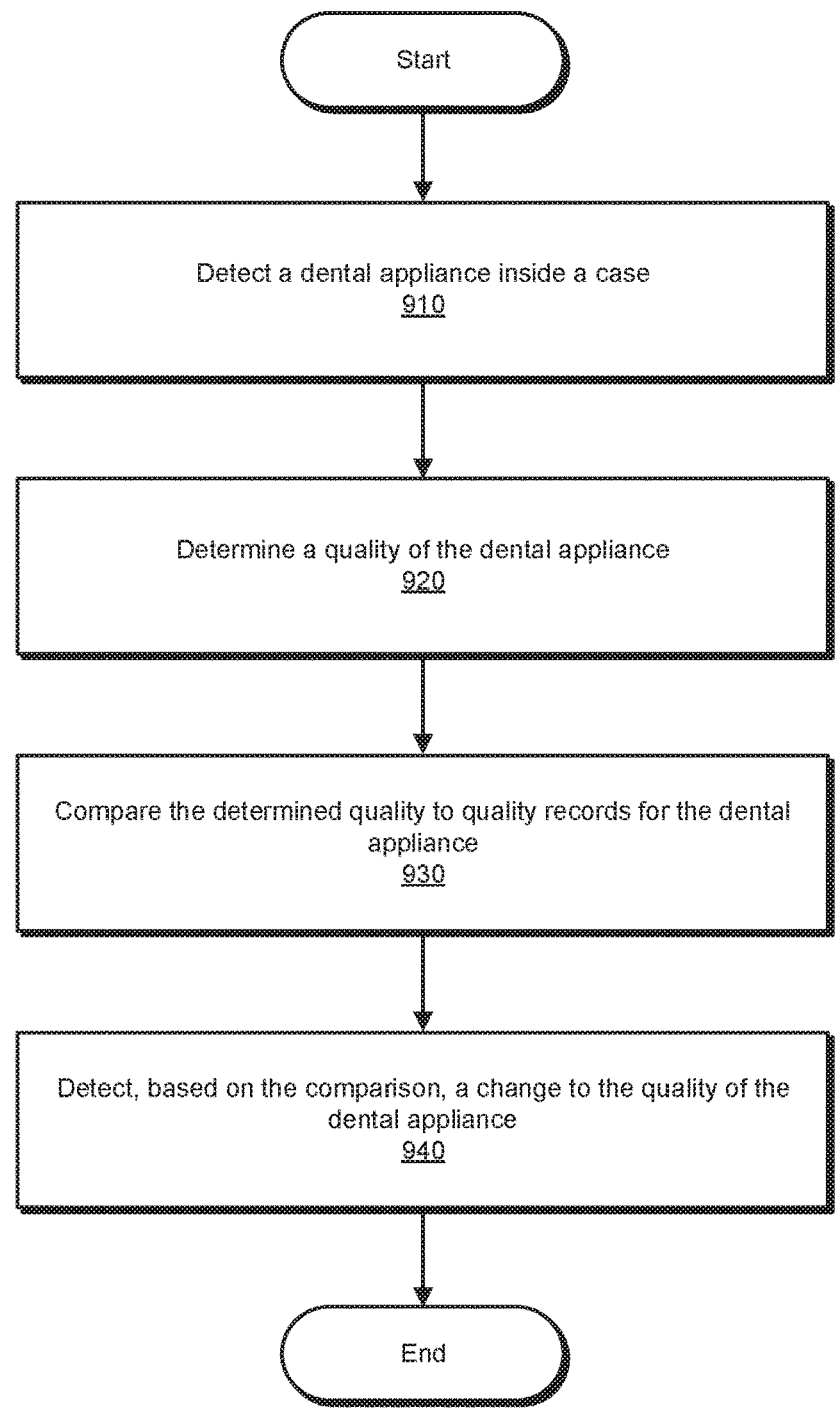
FIG. 9 shows a flowchart of a method in accordance with some embodiments.

FIG. 9 illustrates a flowchart of an exemplary method 900 for detecting a quality change of a dental appliance in a case. As described herein, the quality may correspond to one or more of a shape (e.g., via contact signature and/or 3D signature), material composition, material property, etc. and other detectable characteristics (e.g., reflectivity, dielectric property, etc.) which may correspond to quality issues. Common dental appliance failures and/or defects, such as warpage, poor edge quality, discoloration, breakage, cracks, etc., may be detected.

At 910, a dental appliance is detected inside a case. The case 310 may detect the presence of the dental appliance 106 via the digitizer platform 316 and/or the sensors 318 in a variety of ways, as discussed above. For instance, the sensors 318 may include a pressure sensor for detecting the dental appliance 106 pressing against the tray 314. The sensors 318 may include an optical sensor for detecting the dental appliance 106 and/or the markers 727. In some implementations, detecting the dental appliance 106 may include identifying the dental appliance 106, for instance through scanning a tag and/or computer vision. For example, the patient may have different dental appliances for the patient's upper and lower jaws. Both dental appliances 106 may be present in the case 310 (see, e.g., FIG. 3B), which may both be identified and effectively tracked simultaneously. Alternatively, other patients may use the case 310 for their dental appliances. However, in certain implementations, the case 310 may be linked to one or more particular dental appliances 106 such that unrecognized or unauthorized dental appliances may be ignored. For instance, counterfeit dental appliances may be identified. Alternatively, a type of dental appliance may trigger specific events. For instance detecting an aligner may trigger one type of action (e.g., a particular detection scheme) whereas detecting a retainer may trigger a different type of action (e.g., a different detection scheme). In some implementations, identifying the dental appliance 106 may further include identifying the orientation of the dental appliance 106 within the case 310. The orientation of the dental appliance 106 may factor into the quality determinations described herein.

At 920, a quality of the dental appliance may be determined. For example, the case 310 and/or the processor connected thereto may detect the shape using the digitizer platform 316 and/or sensors 318 as described herein. In some implementations, a combination of detection schemes may be used for the dental appliance 106. For instance, all detection schemes (e.g., contact signature, 3D signature, reflectivity, dielectric property, etc.) or a subset thereof may be applied. In some implementations, a specific combination of detection schemes may be applied to a specific dental appliance 106. For instance, contact signature may be applied to the dental appliance 106 for the patient's upper jaw, and 3D signature may be applied to the dental appliance 106 for the patient's lower jaw. In certain implementations, the detection schemes may be exclusive to particular dental appliances which may produce more accurate measurements for each when multiple dental appliances are detected. For example, contact signature may be applied to the dental appliance 106 for the patient's upper jaw, and 3D signature may be applied to the dental appliance 106 for the patient's lower jaw, such that when both dental appliances 106 are detected within the case 310, both may be measured without interference with the other's measurement. In certain implementations, the detection schemes applied may be based on a number of dental appliances associated with and/or detected within the case 310.

At 930, the determined quality may be compared against quality records for the dental appliance. For the corresponding detection scheme, prior data may be stored, for example in a memory coupled to the case 310. The memory may be located on or remotely connected to the case 310 and/or the processor coupled thereto, using wired and/or wireless connections. The current measurements may be compared against the prior data from prior measurements for the respective dental appliance. In some implementations, the quality records may include and/or be reflected of other collected data, such as data from other patients' dental appliances. Such aggregate analysis may provide further insight and/or improvement to detecting deviations. For instance, the various thresholds described herein may be updated based on the aggregate analysis. In addition, the current measurements may be added to the quality records.

At 940, a change to the quality of the dental appliance may be detected based on the comparison. As discussed herein, the quality may be tracked over time. Such monitoring may provide indications as to quality issues (e.g., degradation of the dental appliance). The monitoring may also identify a stage of the treatment process. For instance, detected deformations may correspond to a specific stage or milestone of the treatment. A progress of the treatment may be determined, for instance based on a timing of when a milestone is reached compared to an expected timing. Other deviations may indicate issues to be addressed by the patient and/or treatment professional. For example, certain deformations may correspond to the patient deviating from the treatment process. Other deformations may indicate a need for the treatment professional to modify or customize the treatment, such as if a tooth has not moved as expected.

Thus, the systems and methods described herein may provide tracking of one or more qualities of dental appliances using the dental appliances' cases. When a patient stores his or her dental appliance in its corresponding case, the case may measure one or more measurable aspects using sensors configured to detect these aspects of the dental appliance. By tracking these measurements over time, quality issues regarding the dental appliance may be detected. For example, expected and/or unexpected warping may be detected, changes to the material composition may be detected, etc. These changes may further be indicative of issues that may need to be addressed by the patient and/or a treatment professional.

Figure 10D:
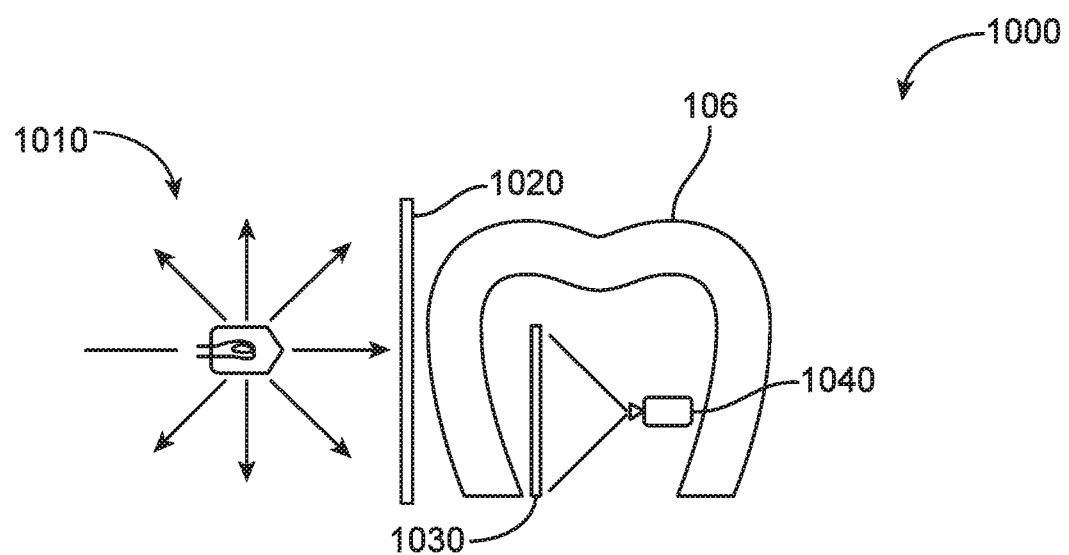
FIG. 10D shows a system for the observation of birefringence patterns in buccal (or outer) and lingual (or inner) sidewalls of the dental appliance in accordance with some embodiments.

FIG. 10D shows a system 1000 for the observation of birefringence patterns in buccal (or outer) and lingual (or inner) sidewalls of the dental appliance 106. In FIG. 10D, the light source 1010 and the first polarizer 1020 are located on a first side of a tooth receiving cavity of the dental appliance 106, for example a buccal side outside the arch of the dental appliance 106, while the second polarizer 1030 and the camera 1040 are located within the tooth receiving cavity or cavities of the dental appliance 106. In such an arrangement, light from the light source 1010 is polarized at a first angle by the first polarizer 1020 and then projected through a outer or facial or buccal sidewall of the appliance, and then through the second polarizer 1030 that is oriented 90° to the first polarizer 1020. The camera 1040 may observe the birefringence pattern in the dental appliance 106 through the second polarizer 1030.

In some embodiments, the light source 1010 and the first polarizer 1020 are located on a first side of a tooth receiving cavity of the dental appliance 106, for example a lingual side within the arch of the dental appliance 106, while the second polarizer 1030 and the camera 1040 are located within the tooth receiving cavity or cavities of the dental appliance 106. In such an arrangement, light from the light source 1010 is polarized at a first angle by the first polarizer 1020 and then projected through an inner or lingual sidewall of the appliance, and then through the second polarizer 1030 that is oriented 90° to the first polarizer 1020. The camera 1040 may observe the birefringence pattern in the dental appliance 106 through the second polarizer 1030.

The arrangement shown in FIG. 10D may be implemented in a dental appliance case, such as case 310 by placing the light source and first polarizer in the case such that when the dental appliance 106 is placed within the case, the light source and polarizer are within tooth receiving cavities of the dental appliance 106, such as between buccal and lingual sidewalls of the tooth receiving cavities. In some embodiments, the first polarizer and light source may be shaped along a U-shaped wall that follows the curve of the arch of the aligner 106. A second polarizer 1030 and one or more cameras 1040 may be placed about the outside or sidewalls the case 310. In some embodiments, the location of the light source and first polarizer may be about the outside or sidewalls of the case 310 while the second polarizer and sensor or camera 1040 is located within tooth receiving cavities of the dental appliance 106.

In some embodiments the light source may be a polarized light source and the first polarizer 1020 may be omitted. Similarly, the second polarizer 1030 may be integrated into the sensor or camera 1040.

Figure 11:
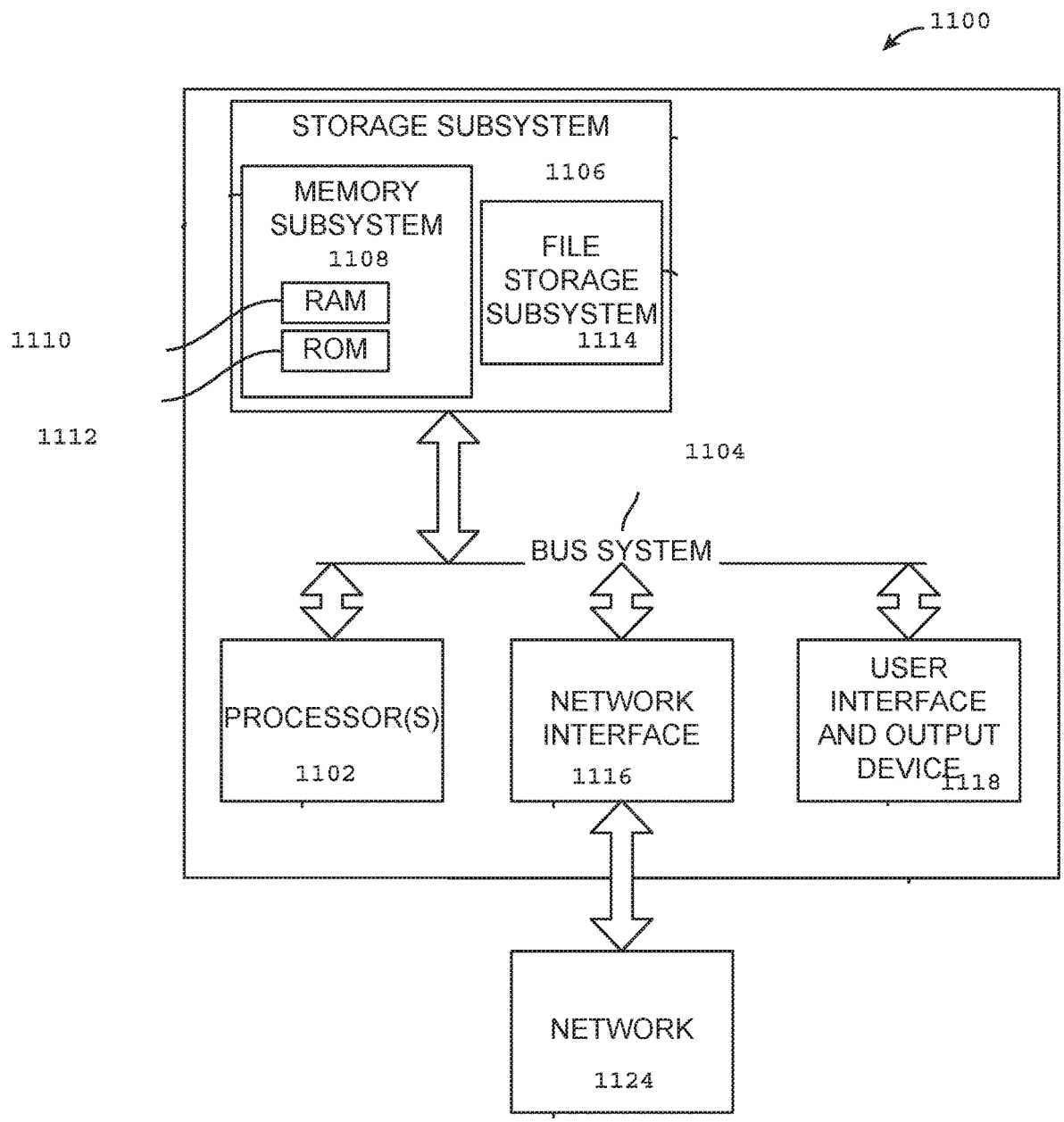
FIG. 11 shows a simplified block diagram of a data processing system.

FIG. 11 is a simplified block diagram of a data processing system 1100 that may be used in executing methods and processes described herein. The data processing system 1100 typically includes at least one processor 1102 that communicates with one or more peripheral devices via bus subsystem 1104. These peripheral devices may include a storage subsystem 1106 (memory subsystem 1108 and file storage subsystem 1114), a set of user interface input and output devices 1118, and an interface to outside networks 1116. This interface is shown schematically as "Network Interface" block 1116, and is coupled to corresponding interface devices in other data processing systems via communication network interface 1124. Data processing system 1100 can include, for example, one or more computers, such as a personal computer, workstation, mainframe, laptop, and the like.

The user interface input devices 1118 are not limited to any particular device, and may include, for example, a keyboard, pointing device, mouse, scanner, interactive displays, touchpad, joysticks, etc. Similarly, various user interface output devices can be employed in a system of the invention, and can include, for example, one or more of a printer, display (e.g., visual, non-visual) system/subsystem, controller, projection device, audio output, and the like.

Storage subsystem 1106 maintains the basic required programming, including computer readable media having instructions (e.g., operating instructions, etc.), and data constructs. The program modules discussed herein are typically stored in storage subsystem 1106. Storage subsystem 1106 typically includes memory subsystem 1108 and file storage subsystem 1114. Memory subsystem 1108 typically includes a number of memories (e.g., RAM 1110, ROM 1112, etc.) including computer readable memory for storage of fixed instructions, instructions and data during program execution, basic input/output system, etc. File storage subsystem 1114 provides persistent (non-volatile) storage for program and data files and can include one or more removable or fixed drives or media, hard disk, floppy disk, CD-ROM, DVD, optical drives, and the like. One or more of the storage systems, drives, etc may be located at a remote location, such coupled via a server on a network or via the internet/World Wide Web. In this context, the term "bus subsystem" is used generically so as to include any mechanism for letting the various components and subsystems communicate with each other as intended and can include a variety of suitable components/systems that would be known or recognized as suitable for use therein. It will be recognized that various components of the system can be, but need not necessarily be at the same physical location, but could be connected via various local-area or wide-area network media, transmission systems, etc.

As detailed above, the computing devices and systems described and/or illustrated herein broadly represent any type or form of computing device or system capable of executing computer-readable instructions, such as those contained within the modules described herein. In their most basic configuration, these computing device(s) may each comprise at least one memory device and at least one physical processor.

The term "memory" or "memory device," as used herein, generally represents any type or form of volatile or non-volatile storage device or medium capable of storing data and/or computer-readable instructions. In one example, a memory device may store, load, and/or maintain one or more of the modules described herein. Examples of memory devices comprise, without limitation, Random Access Memory (RAM), Read Only Memory (ROM), flash memory, Hard Disk Drives (HDDs), Solid-State Drives (SSDs), optical disk drives, caches, variations or combinations of one or more of the same, or any other suitable storage memory.

In addition, the term "processor" or "physical processor," as used herein, generally refers to any type or form of hardware-implemented processing unit capable of interpreting and/or executing computer-readable instructions. In one example, a physical processor may access and/or modify one or more modules stored in the above-described memory device. Examples of physical processors comprise, without limitation, microprocessors, microcontrollers, Central Processing Units (CPUs), Field-Programmable Gate Arrays (FPGAs) that implement softcore processors, Application-Specific Integrated Circuits (ASICs), portions of one or more of the same, variations or combinations of one or more of the same, or any other suitable physical processor.

Although illustrated as separate elements, the method steps described and/or illustrated herein may represent portions of a single application. In addition, in some embodiments one or more of these steps may represent or correspond to one or more software applications or programs that, when executed by a computing device, may cause the computing device to perform one or more tasks, such as the method step.

In addition, one or more of the devices described herein may transform data, physical devices, and/or representations of physical devices from one form to another. For example, one or more of the devices recited herein may receive image data of a sample to be transformed, transform the image data, output a result of the transformation to determine a 3D process, use the result of the transformation to perform the 3D process, and store the result of the transformation to produce an output image of the sample. Additionally or alternatively, one or more of the modules recited herein may transform a processor, volatile memory, non-volatile memory, and/or any other portion of a physical computing device from one form of computing device to another form of computing device by executing on the computing device, storing data on the computing device, and/or otherwise interacting with the computing device.

The term "computer-readable medium," as used herein, generally refers to any form of device, carrier, or medium capable of storing or carrying computer-readable instructions. Examples of computer-readable media comprise, without limitation, transmission-type media, such as carrier waves, and non-transitory-type media, such as magnetic-storage media (e.g., hard disk drives, tape drives, and floppy disks), optical-storage media (e.g., Compact Disks (CDs), Digital Video Disks (DVDs), and BLU-RAY disks), electronic-storage media (e.g., solid-state drives and flash media), and other distribution systems.

A person of ordinary skill in the art will recognize that any process or method disclosed herein can be modified in many ways. The process parameters and sequence of the steps described and/or illustrated herein are given by way of example only and can be varied as desired. For example, while the steps illustrated and/or described herein may be shown or discussed in a particular order, these steps do not necessarily need to be performed in the order illustrated or discussed.

The various exemplary methods described and/or illustrated herein may also omit one or more of the steps described or illustrated herein or comprise additional steps in addition to those disclosed. Further, a step of any method as disclosed herein can be combined with any one or more steps of any other method as disclosed herein.

Unless otherwise noted, the terms "connected to" and "coupled to" (and their derivatives), as used in the specification and claims, are to be construed as permitting both direct and indirect (i.e., via other elements or components) connection. In addition, the terms "a" or "an," as used in the specification and claims, are to be construed as meaning "at least one of." Finally, for ease of use, the terms "including" and "having" (and their derivatives), as used in the specification and claims, are interchangeable with and shall have the same meaning as the word "comprising."

The processor as disclosed herein can be configured with instructions to perform any one or more steps of any method as disclosed herein.

As used herein, the term "or" is used inclusively to refer items in the alternative and in combination.

As used herein, characters such as numerals refer to like elements.

Embodiments of the present disclosure have been shown and described as set forth herein and are provided by way of example only. One of ordinary skill in the art will recognize numerous adaptations, changes, variations and substitutions without departing from the scope of the present disclosure. Several alternatives and combinations of the embodiments disclosed herein may be utilized without departing from the scope of the present disclosure and the inventions disclosed herein. Therefore, the scope of the presently disclosed inventions shall be defined solely by the scope of the appended claims and the equivalents thereof.

What is claimed is:

1. A case for a dental appliance, the case comprising:
   a tray including a flat platform for supporting the dental appliance directly thereon;
   a cover coupled to the tray; and
   at least one contact sensor on the tray configured to detect positions of a plurality of contact points of the dental appliance between the dental appliance and the tray over time, the contact sensor couplable in electronic communication to a processor configured to determine a deformation of the dental appliance based on tracking a change in relative positions of the plurality of contact points of the dental appliance and the tray over time.

2. The case of claim 1, wherein the deformation is detected based on changes in a number of the plurality of contact points.

3. The case of claim 1, further comprising an accelerometer for determining an orientation of the tray, wherein the relative positions of the plurality of contact points is tracked based on the orientation.

4. The case of claim 3, wherein the plurality of contact points is not tracked when the tray has a tilted orientation.

5. The case of claim 1, wherein further comprising a pressure sensor.

6. The case of claim 5, wherein the pressure sensor is configured to detect whether the dental appliance is on the tray.

7. The case of claim 1, wherein the at least one sensor comprises a digitizer platform.

8. The case of claim 7, wherein the digitizer platform comprises a capacitive sensor to detect each of the plurality contact points and a corresponding location of each of the contact points on the tray.

9. The case of claim 8, wherein the digitizer platform comprises an array of electrodes to detect locations of the plurality of contact points based on an electrical current between the array of electrodes and the plurality of contact points.

10. The case of claim 8, wherein the at least one sensor comprises a conductive sensor configured to detect a plurality of parallel conductive traces on the dental appliance.

11. The case of claim 8, wherein the digitizer platform comprises a digitizer coupled to processor to determine corresponding locations of the plurality of contact points on the tray.

12. The case of claim 8, wherein the digitizer platform is configured to detect locations of a plurality of contact points of a polymeric shell appliance.

13. The case of claim 8, wherein the digitizer platform is configured to detect locations of each of the plurality of contact points with a spatial resolution finer than about 1 mm.

14. The case of claim 1, wherein the at least one sensor is configured to detect the deformation based on tracking three-dimensional (3D) points of the dental appliance.

15. The case of claim 14, wherein the at least one sensor comprises an optical sensor.

16. The case of claim 15, wherein the at least one sensor comprises a camera to generate an image of the appliance on the tray and detect the deformation based on the image.

17. The case of claim 15, further comprising a light emitter, and wherein the optical sensor is configured to detect a plurality of reflective markers on the dental appliance.

18. The case of claim 14, wherein the at least one sensor comprises a magnetic sensor configured to detect a plurality of magnets on the dental appliance.

19. The case of claim 1, further comprising a tag reader for identifying the dental appliance.

20. The case of claim 19, wherein the tag reader comprises one or more of a QR code reader, a bar code reader, or an RFID scanner.

21. The case of claim 1, wherein the case is operatively coupled to a processor configured to determine a treatment modification based on the deformation.

22. The case of claim 1, further comprising a processor operatively coupled to the at least one sensor to determine a first shape of the appliance at a first time and a second shape of the appliance at a second time and to detect the deformation based on a difference between the first shape and the second shape.

23. The case of claim 22, wherein the processor comprises one or more of a processor supported with the tray or a remote server.

24. The case of claim 22, wherein the processor comprises instructions to detect deformation of the appliance in response to a difference in relative locations of a plurality of contact points.

25. The case of claim 22, wherein the first shape comprises a first number of contact points and a second shape comprises a second number of contact points and wherein the processor comprises instructions to detect deformation of the appliance in response to a difference between the first number of contact points and the second number of contact points.

26. The case of claim 22, wherein the processor comprises instructions to determine an orientation of the appliance, the orientation comprises a first orientation corresponding to an occlusal side of the appliance contacting the tray and a second orientation corresponding to a gingival side of the appliance contacting the tray.

27. The case of claim 22, wherein the processor comprises instructions to determine a plurality of shapes of the appliance over a plurality of days, and wherein the processor is configured to detect deformation of the appliance.

* * * * *